United States Patent Office 3,209,031
Patented Sept. 28, 1965

3,209,031
PROCESS FOR THE PREPARATION OF O,N-DIALKYLHYDROXYLAMINES
Otto Scherer, Frankfurt am Main, and Günter Schneider, Buchschlag, near Frankfurt am Main, Germany, assignors to Farbwerke Hoechst Aktiengesellschaft vormals Meister Lucius & Brüning, Frankfurt am Main, Germany, a corporation of Germany
No Drawing. Filed Nov. 17, 1960, Ser. No. 69,809
Claims priority, application Germany, Nov. 24, 1959, F 29,915
4 Claims. (Cl. 260—583)

The present invention relates to a new process for the preparation of O,N-dialkylhydroxylamines.

For the preparation of O,N-dimethylhydroxylamine two processes have been described hitherto.

According to L. W. Jones (Am. Chem. J., 20, 40 (1898)) N-hydroxyurethane is double methylated by means of methyl iodide and then split with concentrated hydrochloric acid in a sealed tube into the hydrochloride of O,N-dimethylhydroxylamine.

According to R. T. Major and E. E. Fleck (J. Am. Chem. Soc., 50, 1479 (1928)) the methylation of O-hydroxyurethane can also be carried out with dimethylsulfate. The O,N-dimethylhydroxyurethane which is formed, is hydrolyzed into free O,N-dimethylhydroxylamine by means of alcoholic potassum hydroxide solution.

The mentioned processes, however, are not appropriate for a technical production of O,N-dialkylhydroxylamines, as the N-hydroxyurethane which is used as initial product is difficultly accessible.

Now we have found that O,N-dialkylhydroxylamines of the formula

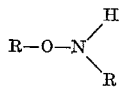

in which R represents a member of the group consisting of methyl and ethyl can be prepared in a simple manner by reacting an alkali metal nitrite, an alkali metal hydrogen sulfite and sulfur dioxide to form an alkali metal hydroxylamine disulfonate and then hydrolyzing and alkylating said disulfonate, the alkylation being carried out with an alkylation agent of the group consisting of dimethylsulfate, diethylsulfate, methyl iodide, ethyl iodide, methyl bromide and ethyl bromide.

The preparation of the desired product can be accomplished by (a) alkylating the hydroxyl group of the alkali metal hydroxylamine disulfonate, then hydrolyzing to split off a sulfonic acid group, N-alkylating the O-alkylhydroxylamine monosulfonic acid formed, or (b) hydrolyzing the alkali metal hydroxylamine disulfonate to split off a sulfonic acid group, dialkylating the resulting hydroxylamine monosulfonic acid, and finally hydrolyzing the O,N-dialkylhydroxylamine monosulfonic acid obtained by either route to the desired O,N-dialkylhydroxylamine.

This result was surprising, as it has been known for a long time that under the action of alkali the hydroxylaminemonosulfonic acid decomposes easily into sulfite and hyponitrite. (A. Angeli, Sammlung Chem. und Technischer Vorträge, Stuttgart, 1908, vol. 13, p. 25; Claus, Liebigs Ann. Chem. 158, 88 (1871); Raschig, Liebigs Ann. Chem. 241, 183 (1887) and Ber. Dtsch. Chem. Ges. 20, 586 (1887)). The decomposition proceeds according to the following equation:

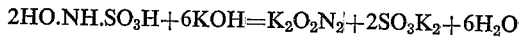

As alkali metal nitrites and alkali metal hydrogensulfites especially the sodium and potassium salts enter into consideration. As alkylating agents the methyl and ethyl esters of mineral acids are appropriate, for example the esters of hydrohalic acids, such as methylbromide and -iodide, ethylbromide and -iodide, and the like. Dialkylsulfates, such as dimethyl and diethylsulfate, are preferred. In order to split off one sulfonic acid group of an alkali metal hydroxylaminedisulfonate by hydrolysis it is suitably operated in such a manner that the pH value is adjusted to about 3 by means of a dilute mineral acid, for example 2 M sulfuric acid and the mixture is stirred at room temperature, whereas for the separation of the sulfonic acid group of the O,N-dialkyl-hydroxylaminemonosulfonate dilute mineral acids are caused to act advantageously at a pH value of about 3 at raised temperatures, for example at the reflux temperature of the mixture.

The reaction of the present invention proceeds according to the following scheme, wherein Me represents an alkali metal and R a methyl or ethyl group.

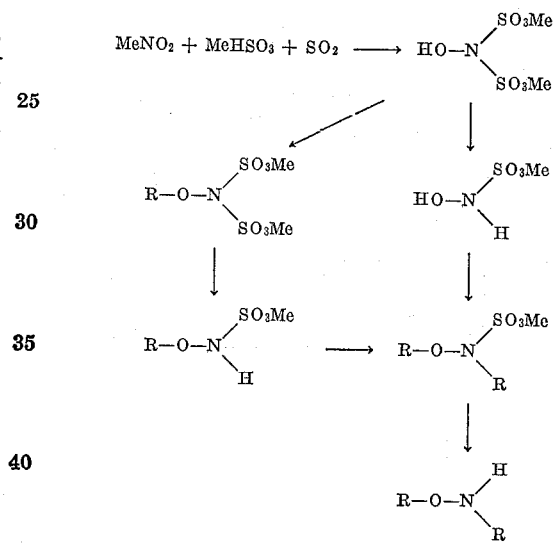

As it can be seen from the scheme, the successive alkylation offers the possibility of introducing different alkyl groups. O,N-dialkylhydroxylamines have gained a considerable interest as intermediate products for the preparation of urea compounds showing good herbicidal action.

The following examples illustrate the invention:

EXAMPLE 1

174 grams (2.5 mols) of sodium nitrite are dissolved in 700 milliliters of water and 265 grams of solid, 90% technical $Na_2S_2O_5$ (corresponding to 2.51 mols of sodiumhydrogensulfite) are added in proportions so rapidly that the temperature does not exceed 30° C.

At a temperature of —2 to —3° C. sulfurdioxide is introduced into this solution. After about 25 minutes 160 grams $SO_2$ (2.5 mols) should be added so that the solution has a pH value of about 3.

2.57 mols of about 8 N-sodium hydroxide solution and 2.5 mols of dimethyl sulfate are then simultaneously added so rapidly that the pH value of the solution amounts to about 10 and the temperature rises to 40–45° C. without external heating or cooling. After cooling the solution is adjusted to a pH value of about 3 with about 2 M sulfuric acid and stirred for 20 hours at room temperature.

The solution is diluted with 500 ml. of water and neutralized at room temperature with 2.15 mols of about 8 N-sodium hydroxide solution. 3.1 mols of about 8 N-sodium hydroxide solution and 2.5 mols of dimethyl sulfate are then simultaneously added so rapidly that the pH value of the solution amounts to about 12 and the temperature rises to 40–50° C.

When the methylation is terminated the solution is adjusted to a pH value of about 3 with 2 M sulfuric acid and then heated for 8 hours under reflux; by subsequent alkaline steam distillation and fractionation of the distillate over a packed column of about 1 m. height, 70–75 grams of crude O,N-dimethylhydroxylamine, containing impurities of about 6% by weight of trimethylhydroxylamine and 12% by weight of methanol are obtained. The crude product contains no monomethylhydroxylamine. By further purification over the hydrochloride pure O,N-dimethylhydroxylamine is obtained in a yield of 35–40%.

EXAMPLE 2

The sodium salt of hydroxylaminedisulfonic acid is prepared according to Example 1.

The solution showing an initial pH value of about 3 is stirred for 24 hours at room temperature and then diluted with 500 milliliters of water.

After neutralization by means of about 8 N-sodium hydroxide solution at a temperature of 20° C., 5.0 mols of dimethyl sulfate and 5.4 mols of about 8 N-sodium hydroxide solution are simultaneously added so rapidly that the pH value of the solution amounts to about 12 and the temperature rises to 40–45° C. without external heating or cooling.

After the methylation is terminated the solution is adjusted to a pH value of about 3 with 2 M sulfuric acid and heated for 8 hours under reflux. By subsequent alkaline steam distillation and fractionation of the distillate over a packed column of about 1 m. height, 60–65 grams of crude O,N-dimethylhydroxylamine are obtained, which is contaminated by 3% by weight of trimethylhydroxylamine and 12% by weight of methanol. The crude product contains no monomethylhydroxylamine. By further purification over the hydrochloride pure O,N-dimethylhydroxylamine is obtained in a yield of 30–35%.

We claim:

1. In a process for preparing an O,N-dialkylhydroxylamine of the formula

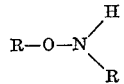

in which R represents a member of the group consisting of methyl and ethyl, from an alkali hydroxylamine monosulfonate of the formula

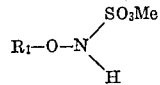

in which $R_1$ stands for a member of the group consisting of hydrogen, methyl and ethyl, and Me is an alkali metal, the steps comprising alkylating said substance by means of the theoretical amount of an alkylating agent of the group consisting of dimethylsulfate, diethylsulfate, methyl iodide, ethyl iodide, methyl bromide and ethyl bromide in an aqueous alkaline medium at about 40–50° C., refluxing the O,N-dialkyl sulfonate thus obtained in an acid medium to form said O,N-dialkylhydroxylamine, and then recovering said O,N-dialkylhydroxylamine from the reaction mixture.

2. The process as in claim 1 wherein $R_1$ is hydrogen.
3. The process as in claim 1 wherein $R_1$ is methyl.
4. The process as in claim 1 wherein $R_1$ is ethyl.

References Cited by the Examiner

Major et al.: J.A.C.S., vol. 50, pps. 1479–81 (1928).
Remy: "Treatise on Inorganic Chemistry," vol. 1, p. 617 (1956).
Traube et al.: Ber., vol. 53, pps. 1477–92 (1920).

CHARLES B. PARKER, *Primary Examiner.*

LEON ZITVER, *Examiner.*